Jan. 8, 1957 K. C. ENVOLDSEN 2,776,746
SHRIMP GRADER
Filed Oct. 6, 1951 2 Sheets-Sheet 1

INVENTOR
Karl C. Envoldsen
BY Evans + McCoy
ATTORNEYS

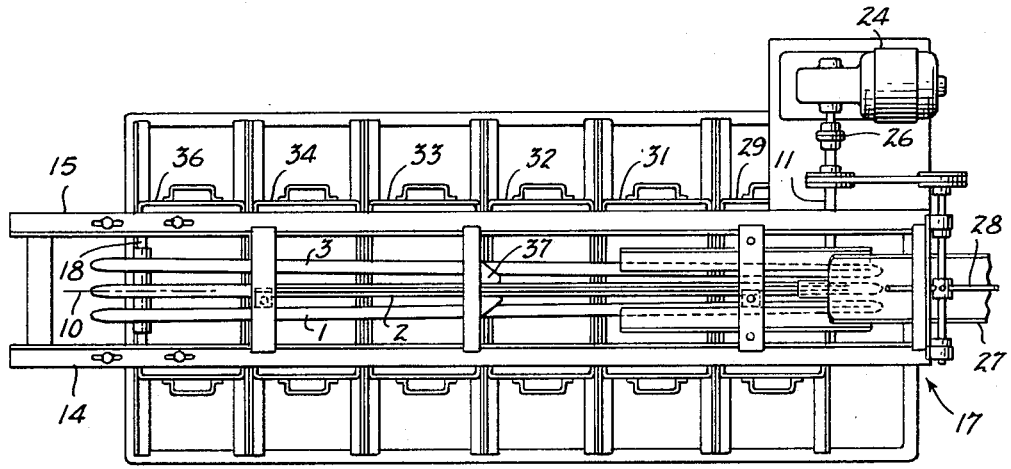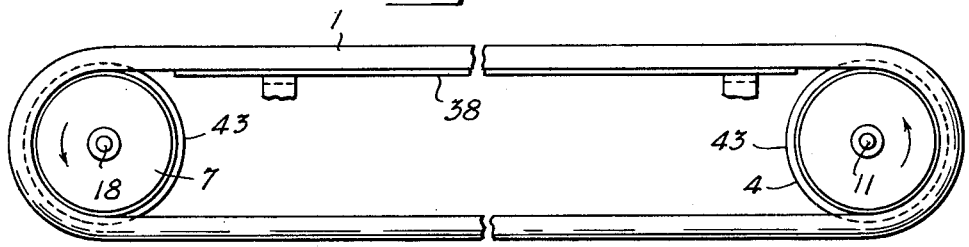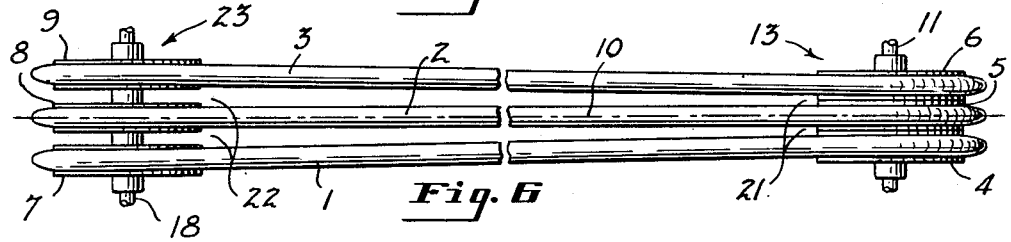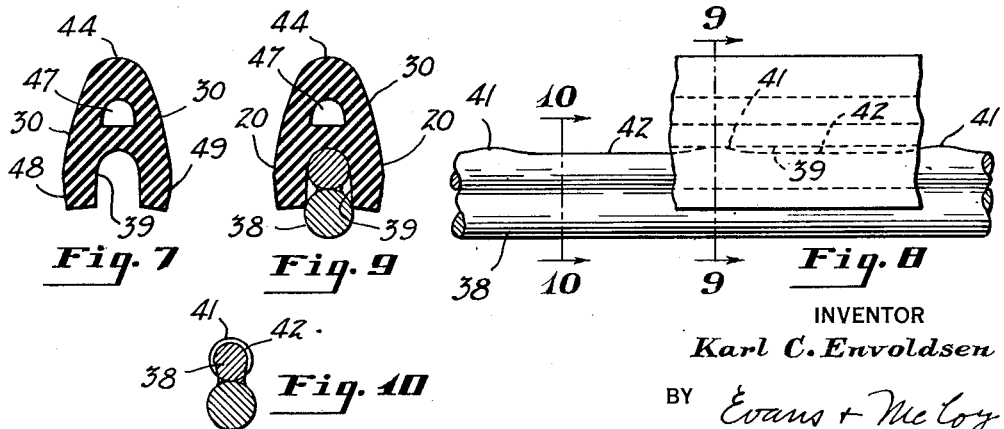

United States Patent Office 2,776,746
Patented Jan. 8, 1957

2,776,746

SHRIMP GRADER

Karl C. Envoldsen, Lakewood, Ohio

Application October 6, 1951, Serial No. 250,135

5 Claims. (Cl. 209—102)

The present invention relates to a grading machine for sizing goods such as nuts, fruits, and vegetables. In particular, it relates to a grading machine for sizing soft and irregularly-shaped goods such as shrimp, and berries.

It is at once apparent that all food handling machinery must not injure the food articles and must be clean and sanitary both in operation and at rest. With grading machines suitable for grading delicate or easily damaged materials such as shrimp particularly, it has been very difficult to develop a machine which does not deteriorate the shrimp and the like and which is sanitary and can be kept so. The belts are often jointed, the belt driving means grooved or toothed, and the belt guide means often grooved or geared, uncovered on the top side, and difficult to reach so that the apparatus tears the food or easily collects and keeps food particles.

A persistent problem with grading machines is to control the distance between the belts so that squeezing is prevented and uniform grading is obtained. While it is obvious that unsanitary links or jointed belts of graders have a tendency for wobbling and need to be guided, continuous, non-jointed belts would seem to require no positive guide means for the belts except the pulleys. I have found, however, that the slight and almost imperceptible unobvious movement or vibration of continuous belts is apparently amplified by the materials being graded, and that a large portion of the difficulties in the graders before proposed stem from lateral movement. When the belts are pulled tight on the pulleys in an attempt to further control them, they soon stretch out of shape and are useless. Likewise attempts to guide them by external guide means results in excessive surface friction, causes food to catch in the guides, etc., and soon wears the belts out.

It is, accordingly, one object of the subject invention to provide a sanitary, easily cleaned grading machine suitable for grading shrimp and the like which functions to grade in a reproducible manner without having places where food may catch or be mashed.

It is another object of this invention to provide a smooth, continuous belt suitable for a grading machine and which is inexpensive, sanitary and long wearing.

These and other objects will be apparent from the following written description and drawings, in which:

Fig. 4 is a plan view of the apparatus embodying the present invention;

Fig. 5 is a side view of the belts, pulley wheels and guide rods;

Fig. 6 is a plan view of the belts, pulley wheels and guide rods;

Fig. 7 is a cross-sectional view of the belt used in the subject apparatus;

Fig. 8 is a side view of the guide rod with portions of the belt thereon;

Fig. 9 is a cross-section of the belt and guide rod taken along line 9—9 in Fig. 8; and Fig. 10 is a cross-section of the guide rod taken along the line 10—10 in Fig. 8.

Figure 1:
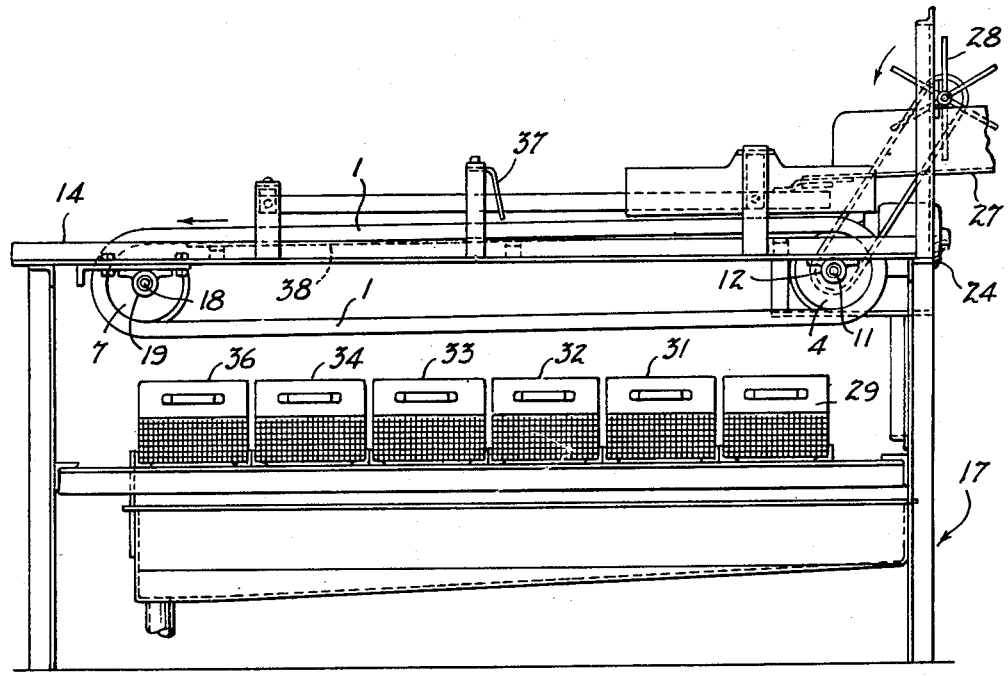
Figure 1 is a side elevation of the apparatus embodying the present invention.
Figure 2:
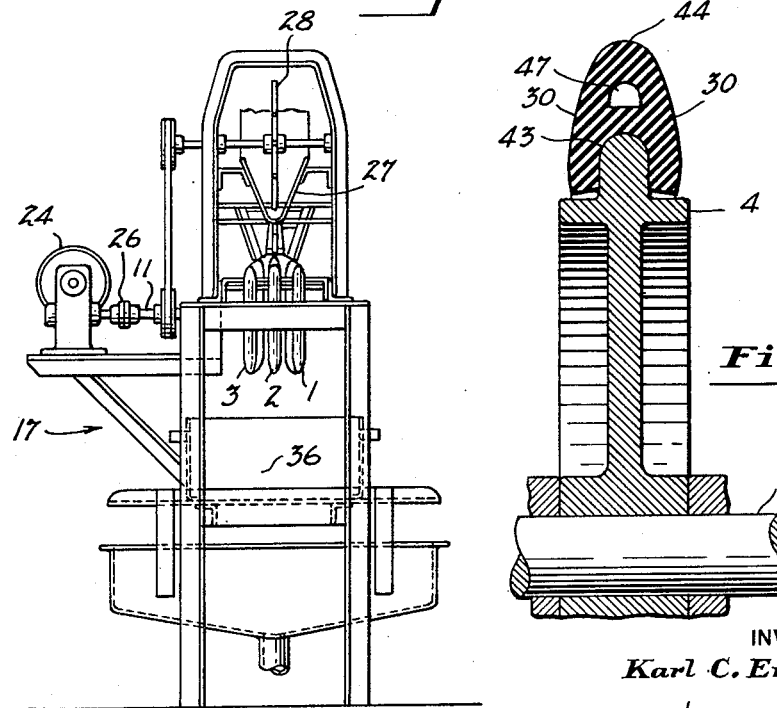
Fig. 2 is an end view of the apparatus showing the feed trough and belt drive means.

The grading apparatus of the present invention comprises at least two non-segmented belts rotating on driven pulleys. The belts are in approximately the same plane and diverge from the feeding trough. A groove in the inner side of the belt fits with the drive pulleys and guide means and the belts are guided and positioned thereby.

Referring now to Figs. 5 and 6, three belts 1, 2, and 3 are shown with the belts aligned in approximately the same plane. Belts 1, 2, and 3 rotate respectively on pulleys 4, 5, and 6 found at the right hand end of the machine. The belts are of the same cross-section and are non-segmented and continuous about the pulleys. Pulleys 4, 5, and 6 in turn are keyed to shaft 11 supported from brackets 12 mounted on bars 14 and 15 on machine frame 17. Pulleys 7, 8, and 9 rotate on shaft 18 which is supported from brackets 19 mounted on bars 14 and 15. Pulleys 5 and 8 are aligned on a center line 10. Pulleys 4 and 6 are spaced equally a relatively small distance from this center line to form the narrow or receiving end 13 of the belts. Pulleys 7 and 9 are spaced a relatively large distance from the center line to form the wide end 23 of the belts.

As seen in Fig. 6, the belts diverge from one another so that the distance 21 between belts at narrow end 13 is less than the distance 22 between belts at wide end 23. Belt rotation is counter-clockwise and the belts are driven by motor and reduction unit 24 through coupling 26 attaching to shaft 11 in turn rotating drive pulleys 4, 5, and 6. The direction of the top portion of belt travel is from right to left. The belts are preferably in a plane which is approximately horizontal.

The articles to be sorted such as shrimp and the like feed down feed trough 27 (Fig. 1) past spacer wheel 28 and onto end 13 of the moving belts. The articles are carried toward the opposite end of the belts and as the distance between each belt increases, the various sized articles drop through the space between the belts into boxes 29, 31, 32, 33, 34 and 35 according to size. Mounted over the moving belts are article equalizing means or scrapers 37 to prevent the articles on the belts from piling up. One or more scrapers may be so disposed over the length of the belts.

The belts are guided internally from below by positive guide means comprising guide bars 38 (Fig. 5) which fit into grooves 39 in the belts. These bars firmly hold and guide the moving belts and maintain them at a positive distance apart. The bars are in line with the pulley wheels and diverge in line with and at the same rate as the pulley wheels. The belt fits over the guide bars as shown in Fig. 9. The bars themselves are preferably relieved at regular intervals so that a minimum amount of bar surface rubs against the belt. This reduces the friction between the bar and belt and still guides and positions the belt. Thus the guide bar 38 has regular or spaced humps or contact rings 41 with ground out, relieved portions 42 in between (Fig. 8). It is highly desirable from a frictional and lubricational standpoint to have the guides contact only a minor portion of the working portion of the belt. Spaced guide portions adequately prevent the objectionable vibratory movement. The cross-sectional view of Fig. 10 also discloses these humps or contact ring portions of the guide bars.

Figure 3:
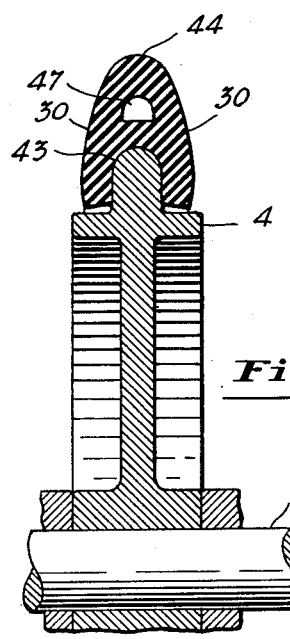
Fig. 3 is an enlarged cross-section of the upper portion of a belt and pulley wheel.

The pulleys driving the belts have circumferential ridges 43 as shown in Fig. 3. The ridges are preferably in the center of the pulley and fit into groove 39 in the belts.

The belts themselves are of smooth rubberlike material such as any of the natural or synthetic rubbers or plasticized polyvinyl chloride, and the like. The belt shape is generally A-shaped with a rounded, vertex portion 44 and base grooved portion comprising legs 48 and 49. Intermediate the two portions is preferably a longitudinal hollow 47. The belt is thus shaped in cross-section similar to the letter A as readily seen from Fig. 7. As previously explained, the legs 48 and 49 forming the groove 39 of the belt grip the pulley ridge 43 and the guide rod 38. The longitudinal hollow 47 facilitates bending of the belt around the pulley and eliminates buckling and increases belt life. The sides of the belt 30 should extend and diverge from the belt center down about to the outermost belt extension line 20 at the inner portion of groove 39 and then break and then diverge in again toward the belt center. Thus the articles being sorted will hang on the outermost belt extension line 20 and then drop freely down. In other words, the greatest lateral extension of the belt should be slightly up toward the vertex from the base thereof. Thus, the sides of the belt form a reverse curve back in towards the center below the point of greatest lateral extension.

The belts can be of any reasonable number over two and of any reasonable length. Thus, many belts will give a grader with a larger capacity and long belts will give a grader with more gradations in size. A particular advantage of this invention is that it can be adapted to long grading machines providing for many gradations. Since the grading is positive in action instead of unrestrained, the capacity of a machine constructed in accordance with this invention is equivalent to machines many times its size. Belt speed should be in the neighborhood of half a foot a second but may be varied within wide limits from this speed depending upon the article being sorted. When hard dry articles such as nuts are being sorted, no additional lubrication is necessary. When softer articles such as shrimp are being sorted, additional lubrication such as water is preferable. I contemplate sorting all sorts of articles with the subject invention such as nuts, shrimp, strawberries, eggs, oranges, and the like.

It is obvious that many changes in details of construction may be made without departing from the spirit of the appended claims.

Having thus described my invention, what I claim is:

1. A sorting machine comprising at least two belts gradually diverging from a narrow to wide end supported in the same plane by pulley wheels at the ends thereof, a discharge trough over the narrow end of said belts, said belts being of rubberlike material generally A-shaped in cross-section with rounded outer contour and a longitudinally grooved inner contour, said pulley wheels having circumferential ridges thereon which are received by the longitudinal grooves in the belt, longitudinally diverging guide rods mounted immediately beneath the upper portion of said belts so that the grooves in the belts fit over said guide rods and the belts are guided thereby, said guide rods being relieved at regular intervals to present a minimum amount of surface contact with the belt, and means to drive said pulleys.

2. A machine according to claim 1 in which the belt has a cross-sectional shape corresponding approximately to a rounded letter A with an apex and base corresponding thereto and with the point of greatest lateral extension slightly up from the base thereof.

3. A machine according to claim 1 in which the belt has a cross-sectional shape corresponding approximately to a rounded letter A with an apex and base corresponding thereto and with the point of greatest lateral extension slightly up from the base thereof and a longitudinal hollow in the apex thereof.

4. A machine according to claim 1 in which the belt is generally A-shaped in cross-section with a base and apex corresponding thereto and with a longitudinal hollow in the apex thereof.

5. A sorting machine comprising at least two belts gradually diverging from a narrow to wide end supported in the same plane by pulley wheels at the ends thereof, a discharge trough over the narrow end of said belts, said belts being of rubberlike material generally A-shaped in cross-section with rounded outer contour and a longitudinally grooved inner contour, said pulley wheels having circumferential ridges thereon which are received by the longitudinal grooves in the belt, longitudinally diverging guide rods mounted immediately beneath the upper portion of said belts so that the grooves in the belts fit over said guide rods and the belts are guided thereby, and means to drive said pulleys.

References Cited in the file of this patent

UNITED STATES PATENTS

| | | |
|---|---|---|
| 501,992 | Crowther | July 25, 1893 |
| 646,402 | Kendall | Mar. 27, 1900 |
| 1,204,685 | Phillips | Nov. 14, 1916 |
| 1,228,044 | Palmer | May 29, 1917 |
| 1,251,093 | Palmer | Dec. 25, 1917 |
| 1,395,770 | Rector | Nov. 11, 1921 |
| 1,552,366 | Wade | Sept. 1, 1925 |
| 1,805,442 | Wallfisch | May 12, 1931 |
| 2,023,421 | Heyer | Dec. 10, 1935 |
| 2,063,008 | Allen | Dec. 8, 1936 |
| 2,350,691 | Mawroner | June 6, 1944 |
| 2,540,245 | Dean | Feb. 6, 1951 |

FOREIGN PATENTS

| | | |
|---|---|---|
| 46,596 | Denmark | Nov. 28, 1932 |
| 594,867 | Great Britain | Nov. 20, 1947 |